United States Patent
Zumbe et al.

(10) Patent No.: US 6,296,891 B1
(45) Date of Patent: *Oct. 2, 2001

(54) PROCESS FOR MANUFACTURE OF REDUCED FAT CHOCOLATE

(75) Inventors: Albert Zumbe, Coventry; Nigel Sanders, West Midlands, both of (GB)

(73) Assignee: Cadbury Schweppes plc, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,221

(22) PCT Filed: Dec. 21, 1995

(86) PCT No.: PCT/GB95/03010

§ 371 Date: Aug. 25, 1997

§ 102(e) Date: Aug. 25, 1997

(87) PCT Pub. No.: WO96/19923

PCT Pub. Date: Jul. 4, 1996

(30) Foreign Application Priority Data

Dec. 23, 1994 (GB) ................................. 9426078

(51) Int. Cl.$^7$ ...................................... A23L 1/20
(52) U.S. Cl. ........................ 426/631; 426/630; 426/593
(58) Field of Search .................. 426/660, 631, 426/593

(56) References Cited

U.S. PATENT DOCUMENTS

| | | | |
|---|---|---|---|
| 2,850,388 | * 9/1958 | Peebles | 426/593 |
| 3,472,658 | * 10/1969 | Isaacs | 426/593 |
| 4,224,354 | * 9/1980 | Szegvari | 426/593 |
| 4,713,256 | * 12/1987 | Chaveron | 426/660 |
| 4,758,444 | * 7/1988 | Terauchi | 426/593 |
| 4,871,562 | * 10/1989 | Terauchi | 426/593 |
| 5,080,923 | 1/1992 | Martin, Jr. et al. | |
| 5,190,796 | 3/1993 | Anderson et al. | |
| 5,464,649 | * 11/1995 | St John | 426/548 |
| 5,490,996 | * 2/1996 | Despland | 426/660 |
| 5,501,865 | * 3/1996 | Zumbe | 426/660 |
| 5,676,995 | * 10/1997 | Cully | 426/660 |
| 5,709,903 | 1/1998 | St. John et al. | 426/660 |
| 5,753,296 | * 5/1998 | Girsh | 426/593 |
| 5,776,536 | * 7/1998 | Tremblay | 426/593 |
| 5,882,709 | * 3/1999 | Zumbe | 426/631 |
| 5,989,619 | * 11/1999 | Zumbe | 426/631 |

FOREIGN PATENT DOCUMENTS

| | | |
|---|---|---|
| 0 285 187 | 1/1988 | (EP) . |
| 0 442 544 | 8/1991 | (EP) . |
| 0 495 553 | 7/1992 | (EP) . |
| 0522704 | 6/1994 | (EP) . |
| 2177283 | 1/1987 | (GB) . |
| WO9409649 | 5/1994 | (WO) . |
| WO9421827 | 9/1994 | (WO) . |
| WO 95/10946 | 4/1995 | (WO) . |

OTHER PUBLICATIONS

Minifie 1989 Chocolate, Cocoa and Confectionery Science and Technology 3rd edition Chapman and Hall New York p 70, 71, 139–143.*
Beckett 1994 Industrial Chocolate Manufacture and Use Blackie Academic & Professional New York p 95–99.*
Minifie 1989 Chocolate, Cocoa & Confectionery: Science & Technology 3rd edition Chapman & Hall New York p139–145.*
Eynck, In–Plant Manufacture of Confectionary Coatings, "Dry Grinding and Mixing of ...", pp. 35–43, 1989.
Darley, "Particle Size Distribution Effects in Chocolate Processing", pp. 1–130, 1987, University of Bradford.
Jensen, Chocolate, "The Chemistry Flavouring and Manufacture of Chocolate Confectionery and Cocoa", pp. 98–102, 1931.
Rhodes, "Principles of Power Tecnology", pp. 249, 267–268, 287–288, 1993, University of Bradford.
Perry, *Perry's Chemical Engineers Handbook*, Sixth Edition, "Size Reduction Combined With...", pp. 8–15, 1984.
Beckett, *Industrial Chocolate Manufacture and Use*, Second Ed., 1994.
Blackie Academic & Professional New York pp. 50, 51, 78, 84, 141, 142, 159, 306, 307, 341–343, 392.
Kirk–Othmer, Encyclopedia of Chemical Technology, Third Ed. vol. 6, "Chocolate and Cocoa", pp. 1–18, 1979.
Hosokawa Micron Ltd., Food Engineering Int'l., "Processing Size Reduction: *The Daily Grind*", pp. 37–38, Jun. 1991.
Niediek, Rev. Int. Choc., "*Normal particle size distribution of block chocolate...*", pp. 290–298, Nov./Dec. 1973.
Robbins, Candy Industry, vol. 148 (7), "Methods for measuring particle size distribution...", pp. 39–43, 1983.
World's Finest Chocolate, Candy Industry, vol. 152 (7), "*World's Finest eases cocoa milling...*", pp. 31–32, 1987.
Tscheuschner et al, Food Science Austral "*Rheological Properties of Chocolate Masses...*", pp. 355–368, 1979.

* cited by examiner

Primary Examiner—Carolyn Paden
(74) Attorney, Agent, or Firm—Jacobson Holman, PLLC

(57) ABSTRACT

A chocolate composition having a total fat content of 18 to 24.9 wt. % is produced by mixing particles of solid chocolate-making ingredients intimately mixed with at least one fat and emulsifier. To reduce the viscosity of the mixture, (a) not more than 1 wt. % of the particles exceed 60 $\mu$m, and (b) not more than 15 wt. % of the particles are less than 2 $\mu$m and/or not more than 20 wt. % of the particles are less than 3 $\mu$m.

12 Claims, No Drawings

PROCESS FOR MANUFACTURE OF REDUCED FAT CHOCOLATE

TECHNICAL FIELD OF THE INVENTION

This invention relates to a process for the manufacture of reduced fat chocolate.

Chocolate is a food with high fat and high energy contents. Milk chocolate, for example, has a fat content varying widely in the range of 27 to 40% by weight, but more typically contains about 31% by weight of fat and has an assimilable total energy content of about 530 kcal/100 g of which the fat content provides more than 50%. Internationally accepted nutritional guidelines propose that fat should provide no more than 30% to 35% energy.

In good quality chocolate, there is a continuous fat phase which coats all the solid particles and fills the voids between them. In theory, reduction in the fat content of chocolate can be simply achieved by reducing the amount of fat ingredients (such as cocoa butter or milk fat) or of fat-containing ingredients (such as cocoa liquor, milk powder or hazelnut) to be mixed with other chocolate-making ingredients to form the chocolate composition. There are, however, technical restraints on fat reduction in chocolate compositions. Chocolate compositions need to be processed in liquid form. Because the continuous liquid phase of such chocolate compositions is the fat phase, the lower the fat content, the more the viscosity increases, thus making it increasingly difficult to process. One of the important processing steps for making chocolate is a flavour-developing step which is traditionally referred to as "conching".

Traditional conching is a time consuming step and alternative flavour-developing steps can be used which involve intimate mixing or kneading of the liquid chocolate ingredients. As the fat content is reduced, the conching or other flavour-developing step becomes increasingly difficult, resulting in less flavour development. Additionally, the reduction in fat available to coat the ingredients, notably sugar, leads to chocolate of inferior mouthfeel.

DESCRIPTION OF THE PRIOR ART

One way of overcoming this problem in the manufacture of chocolate compositions having a reduced fat-derived energy content is to substitute the cocoa butter and/or other metabolisable fat content of the chocolate by partially or wholly non-metabolisable fats. This is disclosed, for example, in EP-A-0285187, EP-A-0285187 and EP-A-0495553. This enables the fat content to be maintained at a level sufficient to permit processing. However, the use of certain of these non-metabolisable fats in chocolate can lead to anal leakage which is likely to limit acceptability by consumers. The effective calorific content of partially or wholly non-metabolisable fats within the body is uncertain.

Other ways of reducing the fat-derived energy content of chocolate involve initial formulation of chocolate having a low fat content wherein the particle size of the solid particles, particularly the sugar particles, is controlled so as to avoid as far as possible the presence of ultrafine particles. These ultrafine particles require large amounts of fat to coat them and thus cause an increase in the viscosity, thereby making processing difficult. Thus, in the case of milk chocolate, it is known that at least about 50% of the surface area of the particles in milk chocolate is produced by the presence of particles below 2 $\mu$m in size. Various proposals have been made for removal of ultrafine particles. U.S. Pat. No. 5080923 discloses a process which involves first reducing granulated nutritive carbohydrate sweetener for use in the composition to a particle size required for the finished product specification by various methods including milling and roll refining. Either before or after size reduction, the nutritive carbohydrate sweetener is blended with fat, i.e. cocoa butter. At this point, water is blended into the mixture so as to dissolve the ultrafines (particles below 10 $\mu$m) and the angular and jagged edges of the larger particles. The mixture is then dried with the sweetener crystals acting as nuclei for recrystallisation. The result is that there is an overall reduction in surface area of up to 50%. However, as some agglomerates now exceed the upper specified particle size limit (about 50 $\mu$m) required for ensuring the desired mouthfeel, a further size reduction step is needed. Inevitably, this creates further ultrafine particles and effectively restricts the possible reduction in fat content to about 27% by weight.

In WO 94/09649, a development of the process of U.S. Pat. No. 5080923 involves the inclusion of an emulsifier with the water when dissolving the ultrafine particles. Also WO 94/09649 teaches the use of a preferred particle size specification wherein substantially all of the particles are between about 3 to 50 $\mu$m in size, even more preferably about 5 to 40 $\mu$m in size, and also teaches that less than 5 wt % of the particles would be below the lower limit and less than 2 wt % of the particles would be above the upper limit. Whilst such particle size distributions may be achievable by dissolving the ultrafines in water and then recrystallising and drying, we have found that it is difficult to dry the mixture following such water treatment. It is necessary to dry the composition because, if surface moisture is present on the sugar particles, the fat phase does not readily cover them. We have also found that such stringent particle size specifications are not necessary to enable manufacture of a good quality low fat chocolate.

DESCRIPTION OF THE INVENTION

According to the present invention, there is provided a process for the manufacture of a chocolate composition having a total fat content of 18 (preferably 18.5) to 24.9 (preferably 24.5) wt %, in which particles of solid chocolate-making ingredients are intimately mixed with at least one fat, wherein (a) not more than 1 wt % of the particles exceed 60 $\mu$m, and (b) not more than 15 wt % of the particles are less than 2 $\mu$m and/or not more than 20 wt % of the particles are less than 3 $\mu$m.

This particle size requirement can be achieved using conventional chocolate processing equipment without the need to use water to dissolve the ultrafine particles. Measurement of particle size distribution is as measured by a Malvern Mastersizer or another instrument of equal or better sensitivity.

The fat will normally consist of cocoa butter and/or butterfat and/or cocoa butter equivalent (CBE). CBE's are fats with a composition similar to cocoa butter, chemically and physically, normally made from nonlauric fats and currently permitted in an amount up to 5 wt % in some countries. The present invention is further applicable to compositions in which some of the cocoa butter is replaced by a partly or wholly non-metabolisable fat, for example Caprenin.

The chocolate composition will normally contain sugar (sucrose) as nutritive carbohydrate sweetener. For sugar-reduced or sugar-free chocolate, the sucrose may be partially or wholly replaced by one or more other nutritive sweeteners such as dextrose, glucose syrup solids, fructose, lactose or maltose. The nutritive carbohydrate sweetener may be partly or wholly replaced by one or more sugar substitutes such as sugar alcohols (eg lactitol, maititol, isomalt, xylitol, mannitol, sorbitol, ethrythritol, preferably lactitol, maltitol, isomalt or any combination thereof); bulking agents (eg polydextrose, inulin, polyfructose, microcrystalline cellulose, preferably polydextrose); and intense sweeteners (eg aspartame, acesulfame-K, cyclamates, saccharin, sucralose, neohesperidin, dihydrochalone, alitame, stevia sweeteners, glycyrrhizin, thaumatin, preferably aspartame and/or acesulfame-K).

In order to improve the viscosity during processing of the chocolate composition, at least one emulsifier will normally be included as an ingredient. Typically, such emulsifiers include lecithin derived from soya bean, safflower, corn, etc, fractionated lecithins enriched with either phosphatidyl choline, phosphatidyl ethanolamine, phosphatidyl inositol; emulsifiers derived from oats, mono- and diglycerides and their tartaric esters, monosodium phosphate derivatives of mono- and diglycerides of edible fats and oils, sorbitan monostearate, polyoxyethylene sorbitan monostearate, hydroxylated lecithin, synthetic phospholipids such as ammonium phosphatides, lactylated fatty acid esters of glycerol and propylene glycol, polyglycerol esters of fatty acids, propylene glycol mono- and diesters of fats and fatty acids. It is preferred to use at least one of soya lecithin and synthetic phospholipids such as ammonium phosphatides and polyglycerol polyricinoleate as the emulsifier.

Chocolate compositions manufactured in accordance with the present invention may further include flavourings, especially those traditionally associated with chocolate, such as vanilla. Other edible substances that may be present in the chocolate composition include those allowed under Council Directive 73/241/EEC of Jul. 24, 1973 relating to cocoa and chocolate products intended for human consumption.

Control of the particle size at the lower end of the range in accordance with the present invention can enable the amount of fat which is bound to the particles to be reduced. For a given fat content, recipes with reduced amounts of bound fat are preferred as they result in a chocolate mass of a less viscous nature because of the higher proportion of free fat. This can be achieved by the use of low fat and/or fat-free cocoa powder and skimmed milk. The moisture content is also an important factor which influences the texture of the chocolate mass and the optimal level is desirable. A reduced moisture content can result in a less viscous texture because of the thickening effect which minor amounts of water can produce in fat-based materials. The resultant chocolate composition which includes the mixture of solid chocolate-making ingredients and said at least one fat most preferably has a moisture content of not more than about 1 wt %.

The chocolate composition may be a plain chocolate, milk chocolate or white chocolate composition and may be molded or extruded to form a bar (filled or solid), it may be molded or deposited to form a solid or a filled chocolate which may be of a single mouthful size, or it may take the form of vermicelli chocolate, chocolate flakes or gianduja nut chocolate derived from any of such chocolate types. Alternatively, it may be used as a coating chocolate.

In the case of milk chocolate, the chocolate composition will normally comprise non-fat cocoa solids, fat, milk solids, nutritive carbohydrate sweetener and emulsifier. In the case of plain chocolate, the chocolate composition will normally comprise non-fat cocoa solids, fat, nutritive carbohydrate sweetener and emulsifier. In the case of white chocolate, the chocolate composition will normally comprise milk solids, fat, nutritive carbohydrate sweetener and emulsifier.

For the manufacture of a milk chocolate composition by means of the process according to the present invention, the base ingredients are usually (a) cocoa powder (preferably low fat, eg 11 wt % fat or lower) and/or cocoa liquor; (b) sucrose and/or dextrose and/or other permitted carbohydrates, but preferably sucrose; and (c) whole milk powder and/or any processed or part-processed milk powder such as skimmed milk powder, whey powder, milk protein concentrate, lactose, modified milk powder, yoghurt powder, but preferably skimmed milk powder and/or whole milk powder. The formulation of these ingredients depends upon the ratio of sugar: milk solids: cocoa solids desired in the final chocolate composition.

The chosen base ingredients are mixed in a food grade blender and then milled to meet the required particle size specification in a hammer, pin or vane mill with classifier. Plain chocolate and white chocolate compositions may be prepared in a similar way except that, in the case of plain chocolate, milk solids are not included, whereas non-fat cocoa solids are not included for white chocolate.

When cocoa liquor is used as a source of cocoa solids, it is preferably milled in a ball mill or roll refiner, either alone or with milk powder depending upon the type of chocolate required, to meet the desired particle size distribution specification. It is then mixed with sucrose or other sweetener which has been pre-milled to meet the specified particle size distribution. Alternatively, some or part of the sugar or other sweetener and/or part of the milk powder can be added to the cocoa liquor before ball milling or roll refining.

In an alternative procedure, the ingredients may be first converted into a crumb using standard techniques known in the art. A further alternative is to prepare a full fat chocolate having a higher-than-desired fat content and then press or solvent extract it to reduce the fat content to not greater than the desired final level. The resultant material can then be cryogenically milled to meet the required particle size specification.

Following this, fat and any other ingredients to be incorporated can be added to complete the final formulation. At this stage, milling is required if the ingredients have been formulated into a chocolate crumb previously. Such milling is preferably effected using cryogenic cooling to meet the required particle size distribution. The same mills as mentioned above for milling the base ingredients may be employed. The milled crumb may then be pasted with remaining fat, emulsifier and other ingredients to produce the desired chocolate composition.

The resultant milled base ingredients for white, plain or milk chocolate, may then be pasted directly with any remaining fat, emulsifier and minor ingredients to give the desired chocolate composition. Milled press cake derived from pressing full fat chocolate as described above may be pasted directly with the remaining fat, emulsifier and other minor ingredients.

DETAILED DESCRIPTION OF THE INVENTION

The invention will now be described in further detail in the following Examples wherein, in all cases, the specified particle size distribution is that not more than 1 wt % of all particles exceed 60 $\mu$m and not more than 15 wt % of particles are less than 2 $\mu$m and/or not more than 20 wt % of particles are less than 3 $\mu$m.

EXAMPLE 1

Sugar (50 kg), skimmed milk powder (22.6 kg) and low fat (11 wt %) cocoa powder (6.1 kg) were premixed and milled at ambient temperature using a Mikro ACM classifier mill, mill speed 7000 rpm, classifier speed 3000 rpm, to a particle size distribution in which the median particle size was 7 $\mu$m and 90% of the particles ($D_{90}$) were below 24.4 $\mu$m.

The above milled powder (10 kg), fat content 1.14 wt % was conched for about 4 hours at speed 1 in the 10 qt (quart) bowl of a Hobart mixer jacketed at 40° C., with cocoa butter (1.75 kg) and butterfat (0.9 kg) until a thick paste was formed. Ammonium phosphatides (65 g) and polyglycerol polyricinoleate (40 g) were added and mixed until fluid. The chocolate produced had a fat content of 22.49 wt % and was hand tempered and molded.

EXAMPLE 2

Sugar (50 kg), full cream milk powder (24.5 kg), skimmed milk powder (6.6 kg) and low fat (11 wt %) cocoa powder (6.1 kg) were premixed and milled at ambient temperature using a Mikro ACM classifier mill, mill speed 7000 rpm, classifier speed 3000 rpm, to a particle size distribution in which the median particle size was 11.2 $\mu$m and $D_{90}$=32.5 $\mu$m. 10 kg of the above milled powder, having a fat content 8.15 wt %, was conched for about 4 hours at speed 1 in the 10 qt bowl of a Hobart mixer jacketed at 40° C. with cocoa butter (1.75 kg) until a thick paste was formed. Ammonium phosphatides (60 g) and polyglycerol polyricinoleate (40 g) were added and mixed until fluid. The chocolate produced had a fat content of 22.49 wt % and was hand tempered and molded.

EXAMPLE 3

100 kg of chocolate crumb having a fat content of 16 wt % was milled using cryogenic cooling to reduce its temperature to below ambient temperature, in a Mikro ACM classifier mill, mill speed 7000 rpm, classifier speed 1000 rpm, to a particle size distribution in which the median particle size was 8.0 $\mu$m and $D_{90}$=21.0 $\mu$m.

10 kg of the above milled crumb was conched for about 4 hours at speed 1 in the 10 qt bowl of a Hobart mixer jacketed at 40° C., with cocoa butter (0.72 kg) until a thick paste was formed. Ammonium phosphatides (80 g) and polyglycerol polyricinoleate (40 g) were added and mixed until fluid. The chocolate produced had a fat content of 22.51 wt % and was hand tempered and molded.

EXAMPLE 4

Cocoa liquor (3 kg) was milled in a ball mill to meet the specified particle size distribution. Sugar (50 kg), full cream milk powder (24.5 kg) and skimmed milk powder (6.6 kg) were individually milled in a Mikro ACM classifier mill, mill speed 7000 rpm, classifier speed 3000 rpm to a particle size distribution in which the median particle size was 8.2 $\mu$m and $D_{90}$=26.7 $\mu$m.

The milled ingredients were then mixed to make a chocolate base having a fat content of 7.94 wt %. Milled cocoa liquor (1.4 kg) and low fat chocolate base (10 kg) were conched, for about 4 hours at speed 1 in the 10 qt bowl of a Hobart mixer jacketed at 40° C. with cocoa butter (250 g) and butterfat (900 g) to form a paste. Ammonium phosphatides (65 g) and polyglycerol polyricinoleate (40 g) were added and mixed until fluid. The chocolate produced had a fat content of 22.38 wt % and was hand tempered and molded.

EXAMPLE 5

5.95 kg of full fat milk chocolate (containing cocoa butter, cocoa solids, sugar and milk solids—total fat content 29 wt % fat) was pressed at 60° C. in a hydraulic press at 400 bar to remove 834 g fat. The press cake, about 17.4 wt % fat, was milled to a particle size distribution in which the median particle size was 9.5 $\mu$m and $D_{90}$=28.5 $\mu$m in a Mikro ACM classifier mill, mill speed 7000 rpm, classifier speed 3000 rpm, using cryogenic cooling to reduce its temperature to below ambient.

5.12 kg of the milled cake was then conched with cocoa butter (0.27 kg), ammonium phosphatides (25 g) and polyglycerol polyricinoleate (40 g) for about 4 hours at speed 1 in the 10 qt bowl of a Hobart mixer jacketed at 40° C. The chocolate produced had a fat content of 22.5 wt % and was hand tempered and molded.

What is claimed is:

1. A process for the manufacture of a chocolate composition having a total fat content of 18 to 24.9 wt %, comprising the steps of:

(1) intimately mixing (a) particles of solid chocolate-making ingredients comprising (i) at least one solid chocolate-making ingredient selected from the group consisting of nutritive carbohydrate sweeteners, sugar substitutes, bulking agents and intense sweeteners, and (ii) at least one other solid chocolate-making ingredient selected from the group consisting of non-fat cocoa solids, cocoa powder, cocoa liquor, milk solids and emulsifier, with (b) at least one fat selected from the group consisting of cocoa butter, cocoa butter equivalents, butterfat, milk fat and non-metabolisable fat;

(2) reducing the size of said particles so that said particles have a particle size distribution, as measured by a Malvern Mastersizer, such that (a) not more than 1 wt % of said particles exceed 60 $\mu$m, and (b) at least one of (i) some but not more than 15 wt % of the particles are less than 2 $\mu$m and (ii) some but not more than 20 wt % of the particles are less than 3 $\mu$m, without the addition of water to dissolve ultrafine particles;

(3) subjecting said mixture of solid chocolate-making ingredients and said at least one fat to a flavour development step to produce a flavour developed mixture; and (4) further processing said flavour-developed mixture to produce a final chocolate composition having a total fat content of 18 to 24.9 wt %.

2. A process as claimed in claim 1, wherein not more than 15 wt % of the particles are less than 2 $\mu$m.

3. A process as claimed in claim 1, wherein not more than 20 wt % of the particles are less than 3 $\mu$m.

4. A process as claimed in claim 1, wherein the total fat content of the chocolate is 18.5 to 24.5 wt %.

5. A process as claimed in claim 1, wherein the moisture content of the mixture of solid chocolate-making ingredients and said at least one fat is not more than about 1 wt %.

6. A process as claimed in claim 1, wherein the solid chocolate-making ingredients are mixed in a blender and then milled to meet the required particle size specification in a hammer, pin or vane mill with classifier.

7. A process as claimed in claim 1, wherein the solid chocolate-making ingredients include cocoa liquor and particulate sweetener, and wherein the cocoa liquor is milled in a ball mill or roll refiner to meet the specified particle size distribution and then mixed with at least some of said particulate sweetener which has been premilled to meet the specified particle size distribution.

8. A process as claimed in claim 7, wherein some of the particulate sweetener is added to the cocoa liquor before ball milling or roll refining.

9. A process as claimed in claim 1, wherein at least some of the solid chocolate-making ingredients are converted into crumb form before being milled to the required particle size distribution.

10. A process as claimed in claim 1, wherein a full fat chocolate having a higher-than-desired fat content is prepared and then pressed or subjected to solvent extraction to reduce the fat content to not greater than the desired final level, and then the resultant material is cryogenically milled to meet the required particle size specification.

11. A process as claimed in claim 1, wherein the solid chocolate-making ingredients are mixed with said at least one fat and with emulsifier to form a paste.

12. A process as claimed in claim 1, wherein the intimate mixture of said chocolate-making ingredients and said at least one fat is subjected to a conching or other flavour-development step.

* * * * *